US 008234112 B2

(12) United States Patent
Kang et al.

(10) Patent No.: US 8,234,112 B2
(45) Date of Patent: Jul. 31, 2012

(54) APPARATUS AND METHOD FOR GENERATING NOISE ADAPTIVE ACOUSTIC MODEL FOR ENVIRONMENT MIGRATION INCLUDING NOISE ADAPTIVE DISCRIMINATIVE ADAPTATION METHOD

(75) Inventors: Byung Ok Kang, Daejeon (KR); Ho Young Jung, Daejeon (KR); Yun Keun Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 949 days.

(21) Appl. No.: 12/109,932

(22) Filed: Apr. 25, 2008

(65) Prior Publication Data

US 2009/0055177 A1 Feb. 26, 2009

(30) Foreign Application Priority Data

Aug. 22, 2007 (KR) .................. 10-2007-0084301

(51) Int. Cl.
*G10L 15/06* (2006.01)

(52) U.S. Cl. ........ 704/244; 704/255; 704/250; 704/256; 704/256.2

(58) Field of Classification Search ............... 704/244, 704/255, 250, 256, 2
See application file for complete search history.

(56) References Cited

U.S. PATENT DOCUMENTS

| | | | |
|---|---|---|---|
| 5,195,167 A | | 3/1993 | Bahl et al. |
| 5,960,397 A | * | 9/1999 | Rahim ........................ 704/244 |
| 6,950,796 B2 | * | 9/2005 | Ma et al. .................... 704/244 |
| 7,072,834 B2 | * | 7/2006 | Zhou .......................... 704/244 |
| 7,254,536 B2 | * | 8/2007 | Deng et al. ................. 704/226 |
| 2005/0228666 A1 | * | 10/2005 | Liu et al. .................... 704/256 |
| 2006/0074656 A1 | * | 4/2006 | Mathias et al. ............. 704/243 |
| 2008/0201139 A1 | * | 8/2008 | Yu et al. ..................... 704/231 |

FOREIGN PATENT DOCUMENTS

KR 10-2005-0021392 3/2005

OTHER PUBLICATIONS

Byung-Ok Kang et al., "Environment Adaptation by Discriminative Noise Adaptive Training Methods", based on proceedings of the Korean Information Processing Society Conference, May 2007, pp. 397-398, vol. 14, No. 1.
Korean Office Action issued on Mar. 17, 2009 in corresponding Korean Patent Application 10-2007-0084301.
Li Deng et al., "Large-Vocabulary Speech Recognition under Adverse Acoustic Environments", ICSLP 2000, pp. 806-809.
Jung-Kuei Chen et al., "A N-Best Candidates-Based Discriminative Training for Speech Recognition Applications", IEEE Transactions on Speech and Audio Processing, vol. 2, pp. 206-216, Jan. 1994.
Korean Office Action issued on Jul. 29, 2009 in corresponding Korean Patent Application 10-2007-0084301.

(Continued)

*Primary Examiner* — Qi Han
(74) *Attorney, Agent, or Firm* — Staas & Halsey LLP

(57) ABSTRACT

Provided are an apparatus and method for generating a noise adaptive acoustic model including a noise adaptive discriminative adaptation method. The method includes: generating a baseline model parameter from large-capacity speech training data including various noise environments; and receiving the generated baseline model parameter and applying a discriminative adaptation method to the generated results to generate an migrated acoustic model parameter suitable for an actually applied environment.

16 Claims, 2 Drawing Sheets

OTHER PUBLICATIONS

Lee et al., "Improved Acoustic Modeling for Speaker Independent Large Vocabulary Continuous Speech Recognition", Speech Research Department, A T & T Bell Laboratories, Murray Hill, NJ 07974, IEEE 1991, pp. 161-164.

Wang et al., "Complete Recognition of Continuous Mandarin Speech for Chinese Language with Very Large Vocabulary Using Limited Training Data", IEEE Transactions on Speech and Audio Processing, vol. 5, No. 2, Mar. 1997 pp. 195-200.

Kang et al., "Discriminative Noise Adaptive Training Approach for an Environment Migration", Speech/Language Information Research Center, Electronics and Telecommunications Research Institute, Daejeon, Korea, four pages.

* cited by examiner

Related context-dependent model

APPARATUS AND METHOD FOR GENERATING NOISE ADAPTIVE ACOUSTIC MODEL FOR ENVIRONMENT MIGRATION INCLUDING NOISE ADAPTIVE DISCRIMINATIVE ADAPTATION METHOD

CROSS-REFERENCE TO RELATED APPLICATION

This application claims priority to and the benefit of Korean Patent Application No. 2007-0084301, filed Aug. 22, 2007, the disclosure of which is incorporated herein by reference in its entirety.

BACKGROUND

1. Field of the Invention

The present invention relates to an apparatus and method for generating a noise adaptive acoustic model for environment migration including a noise adaptive discriminative adaptation method.

The present invention is derived from a project entitled "Development of Large-Capacity Dialogic Distributed Processing Speech Interface for R&D Industry [2006-S-036-02]" conducted as an IT R&D program for the Ministry of Information and Communication (Republic of Korea).

2. Discussion of Related Art

One of the most important factors in a speech recognition technique is to efficiently remove noise caused by an environment. A discrepancy due to environment migration between a training environment and an actual speech recognition environment, which is caused by noise or channel distortion generated by an environment) is one of main factors that deteriorate performance of a commonly used speech recognizer.

In order to enable speech recognition environment migration in the discrepancy between environments, algorithms have been suggested to overcome the discrepancy between environments. Conventionally, noise is estimated at a signal level to be removed, so that a clear speech signal can be obtained, speech that is collected from various noise environments is used to train an acoustic model and a conventional acoustic model is adapted to an actual environment using a small quantity of speech data collected from an actually adapted environment.

However, there still exist drawbacks in the conventionally suggested methods.

SUMMARY OF THE INVENTION

The present invention is directed to an apparatus and method, in which model change information obtained from speech of an upper domain such as a monophone is inherited to all lower speech units used in an actual speech recognition system to overcome the drawback of a conventional Minimum Classification Error (MCE) method, so that optimal speech recognition performance can be produced in an environment where the speech recognition system is actually used.

One aspect of the present invention provides a method of generating a noise adaptive acoustic model, comprising: generating a baseline model parameter from large-capacity speech training data including an environment noise; and receiving the generated baseline model parameter and applying a discriminative adaptation method to generate an adaptive acoustic model parameter.

The generating the baseline model parameter may comprise: removing the noise included in the large-capacity speech training data; and applying an acoustic model training method to the speech training data, from which the noise is removed. Also, the applying the discriminative adaptation method may comprise receiving environment adaptive speech data corresponding to speech collected in a predetermined environment. In addition, a quantity of the environment adaptive speech data may be less than that of the speech training data.

Furthermore, the applying the discriminative adaptation method may comprise: dividing the received baseline model parameter into a simplified phoneme-like unit model parameter and a context-dependent model parameter; applying the divided simplified phoneme-like unit model parameter to the predetermined environment adaptive speech data to perform viterbi decoding; and changing the simplified phoneme-like unit model parameter and the context-dependent model parameter in response to the viterbi-decoded results. Moreover, the simplified phoneme-like unit model parameter may exist in an upper layer of the context-dependent model parameter.

Another aspect of the present invention provides a noise adaptive discriminative adaptation method, comprising: receiving a baseline model parameter; dividing the received baseline model parameter into a simplified phoneme-like unit model parameter and a context-dependent model parameter; applying the divided simplified phoneme-like unit model parameter to predetermined environment adaptive speech data to perform viterbi decoding on the applied results; and changing the simplified phoneme-like unit model parameter and the context-dependent model parameter in response to the viterbi decoded results.

The simplified phoneme-like unit model parameter may exist in all upper layer of the context-dependent model parameter. The step of performing viterbi decoding may comprise the step of generating N-best recognition results and segmented alignment information of the input speech data. The step of changing the simplified phoneme-like unit model parameter may be performed by a minimum classification error method. The step of changing the context-dependent model parameter may be performed in response to phoneme alignment information and loss function score inherited from the simplified phoneme-like unit model parameter.

Still another aspect of the present invention provides an apparatus for generating a noise adaptive acoustic model, comprising: a noise adaptive training unit for generating a baseline model parameter from large-capacity speech training data including an environment noise; and a discriminative training unit for receiving the generated baseline model parameter and applying a discriminative adaptation method to generate an migrated acoustic model parameter.

Yet another aspect of the present invention provides a noise adaptive discriminative training apparatus comprising: a baseline model parameter receiver for receiving a baseline model parameter; a parameter divider for dividing the received baseline model parameter into a simplified phoneme-like unit model parameter and a context-dependent model parameter; an environment adaptive speech data storage unit for storing speech data corresponding to a predetermined environment; a speech recognition unit for applying the divided simplified phoneme-like unit model parameter to data stored in the environment adaptive speech data storage unit to perform viterbi decoding; and a minimum speech classification error unit for changing the simplified phoneme-like unit model parameter and the context-dependent model parameter in response to the viterbi decoded results.

BRIEF DESCRIPTION OF THE DRAWINGS

The above and other features and advantages of the present invention will become more apparent to those of ordinary skill in the art by describing in detail exemplary embodiments thereof with reference to the attached drawings in which.

DETAILED DESCRIPTION OF EMBODIMENTS

The present invention will now be described more fully hereinafter with reference to the accompanying drawings, in which exemplary embodiments of the invention are shown. This invention may, however, be embodied in different forms and should not be construed as limited to the exemplary embodiments set forth herein.

Figure 1:
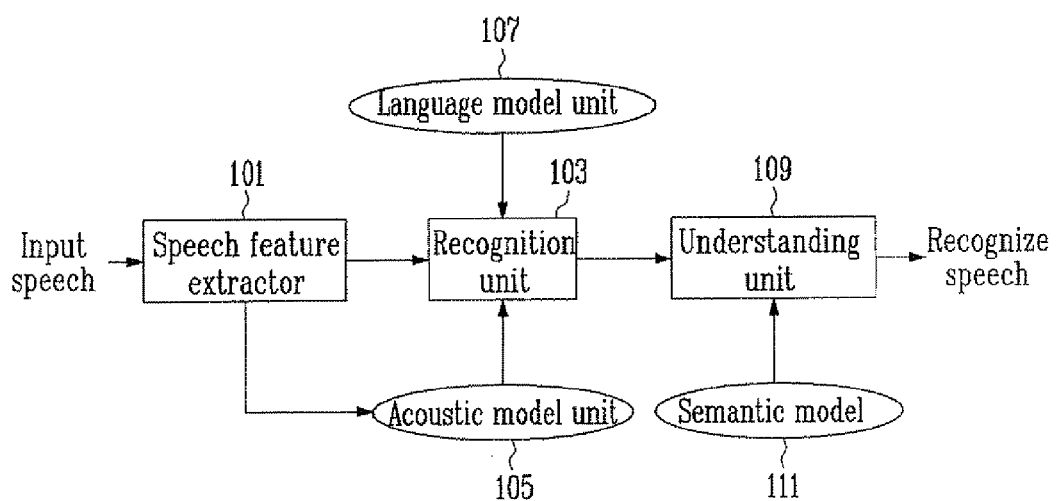
FIG. 1 illustrates the configuration of an apparatus for recognizing speech according to an exemplary embodiment of the present invention.

FIG. 1 illustrates the configuration of an apparatus for recognizing speech according to an exemplary embodiment of the present invention.

Referring to FIG. 1, the apparatus for recognizing speech includes a speech feature extractor 101, a recognition unit 103 and an understanding unit 109, and the recognition unit 103 requires an acoustic model unit 105 and a language model unit 107 to recognize speech. Also, the understanding unit 109 requires a semantic model 111 in order to interpret a meaning of the recognized speech.

The speech feature extractor 101 converts an input speech signal into a signal in another form. The speech signal may be represented in a waveform that is expressed over time. Therefore, an input speech waveform may be converted into a signal in a reduced form that has waveform features. When the speech waveform is converted into a signal, a necessary feature signal only may be extracted and unnecessary information may be excluded to reduce the signal. The reduced signal is referred to as a feature vector.

The recognition unit 103 serves to search for a word sequence having a highest degree of similarity to the feature vector input from the speech feature extractor 101. In order to search for the word sequence that is the most similar to the input feature vector, an acoustic model and a language model are required, and the acoustic model unit 105 and the language model unit 107 are used as the models. The recognition unit 103 uses a viterbi algorithm, by which an optimal route is selected in each case, to search for the word sequence.

Alternatively, there is an N-best method, in which various search methods are used to search for a plurality of word sequences having the high degree of similarity rather than a word sequence having the highest degree of similarity only.

The understanding unit 109 uses the word sequence output from the recognition unit 103 and a meaning model of a word, which is previously determined, to understand the meaning of the recognized word.

The acoustic model unit 105 generates an acoustic model that is required to recognize a word by the recognition unit 103 and recognizes a word pronounced by a user in a unit of phoneme for modeling. In particular, in the case of the acoustic model, since neighboring phonemes have an effect on each pronounced phoneme, the model uses a context-dependent phoneme recognition model as well as a simplified phoneme like unit model. In particular, in order to estimate a parameter of each acoustic model, a training method is used. In the training method, speech training data collected in various environments of large-capacity is used to set an acoustic model that is less affected by features of a speaker and environment noise.

The language model 107 finds out the relationship between words in a given sentence to reflect the results in speech recognition. When words are sequentially given, emphasis is put on the close relationship between a next word to appear and a preceding word. Generally, a statistical model is used as the acoustic model.

Figure 2:
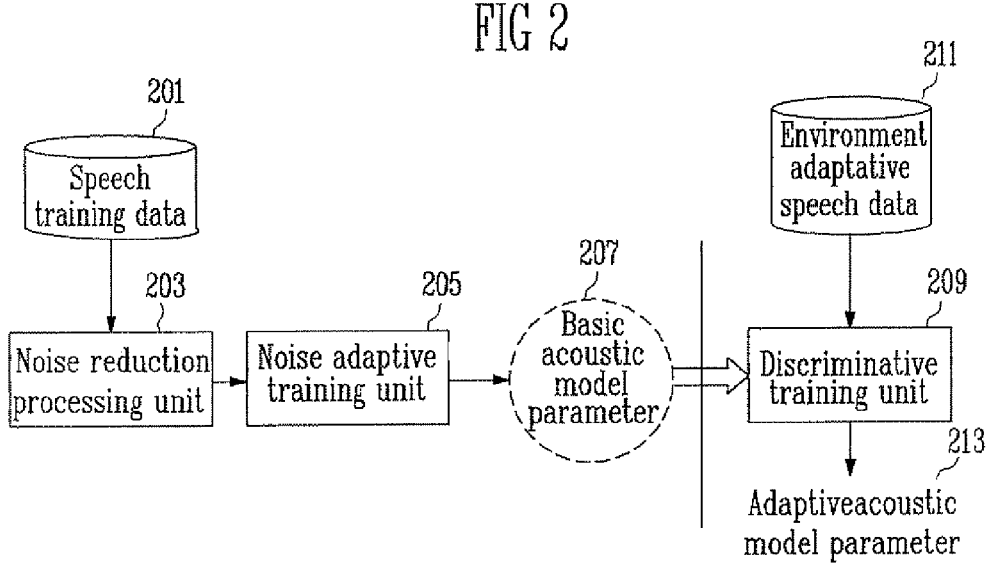
FIG. 2 schematically illustrates a method of designating an acoustic model according to an exemplary embodiment of the present invention.

FIG. 2 schematically illustrates a method of designating an acoustic model according to an exemplary embodiment of the present invention.

Referring to FIG. 2, the method of designating an acoustic model according to the present invention includes large-capacity of speech training data 201, a noise reduction processing unit 203, a noise adaptive training unit 205, environment adaptive speech data 211, and a discriminative training unit 209 to be applied.

The speech training data 201 is large-capacity speech data that is basically used for acoustic model training, and various noise environments are reflected in such data.

The noise reduction processing unit 203 serves to remove various noise ingredients included in the speech training data 201. The noise reduction processing unit 203 may use the Mel-Wrapped Wiener Filter method.

The noise adaptive training unit 205 serves to train using the speech training data, from which the noise ingredients are removed by the noise reduction processing unit 203, using an acoustic model training method. The noise adaptive training unit 205 may use the Maximum Likelihood Estimation method.

The trained acoustic model may be designated as a baseline model parameter 207. The baseline model parameter becomes a basic acoustic model of a speech recognition system.

The environment adaptive speech data 211 is small capacity speech data collected in an environment, to which the speech recognition system is applied. For example, the speech data may be small capacity speech data collected in a vehicle environment of a specific model to be applied to a speech recognition system used for the vehicle environment of the corresponding model. In this case, when data collected from conventional speech training data 201 is used, due to environment migration from the conventional environment and the current environment, accuracy of speech recognition is deteriorated, so that the data is required to complement the defect.

The discriminative training unit 209 receives the environment adaptive speech data 211 and the baseline model parameter 207 to generate a migrated acoustic model parameter 213 that is adapted to a specific environment. The discriminative training unit 209 may adapt a discriminative adaptation method such as a minimum classification error (MCE) method.

The generated migrated acoustic model parameter functions as an acoustic model that is used in a specific environment, to which the speech recognition system is applied.

Figure 3:
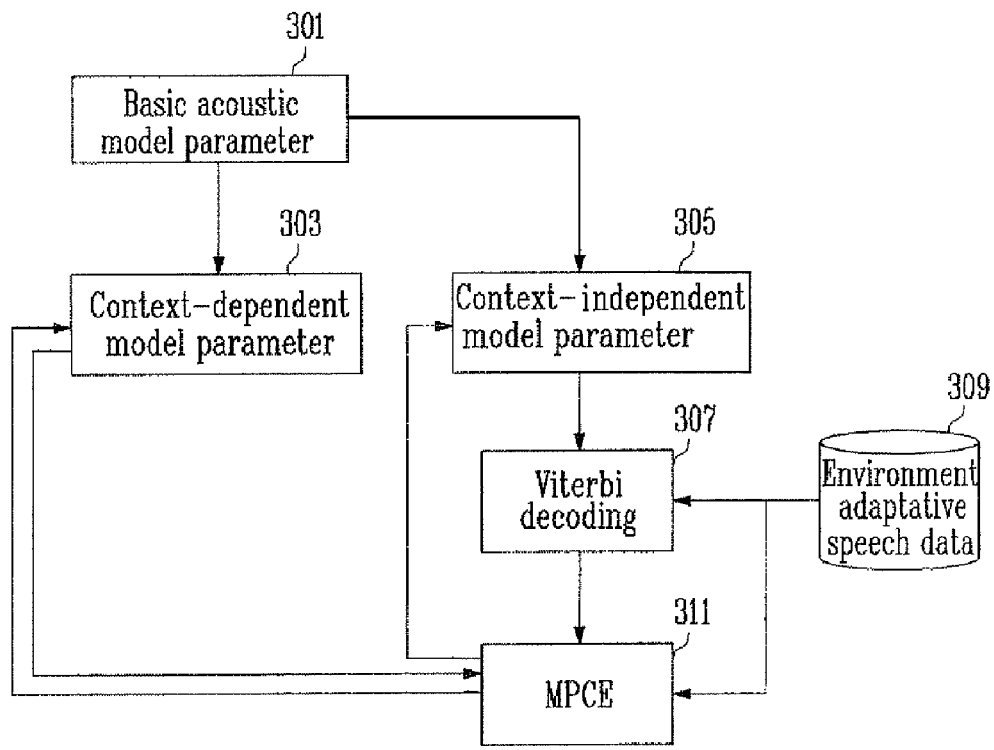
FIG. 3 illustrates a discriminative adaptation method in detail according to an exemplary embodiment of the present invention.

FIG. 3 illustrates a discriminative adaptation method in detail according to an exemplary embodiment of the present invention.

Referring to FIG. 3, in the discriminative training unit, a simplified phoneme-like unit model parameter 305 and a context-dependent phoneme recognition model parameter 303 are determined from a received baseline model parameter 301. Here, as illustrated in FIG. 4, the upper and lower relation is hierarchically formed between the context-dependent phoneme recognition model parameter and the simplified phoneme-like unit model parameter.

First, when the determined simplified phoneme-like unit model parameter 305 is used to perform veterbi decoding 307 on the environment adaptive speech data 309, N-best recognition results and segmented alignment information of each speech data can be obtained. Using the above information, a minimum phoneme classification error unit 311 corrects the simplified phoneme-like unit model parameter 305 and the context-dependent phoneme recognition model parameter 303 to be more discriminative.

In this case, the conventional MCE method is used to change the simplified PLU model parameter 305, and an accumulated model change value that is generated by using phoneme alignment information and loss function score information is used to change the context-dependent phoneme recognition model parameter 303. The phoneme alignment information and loss function score information are obtained through the simplified PLU model parameter 305.

Figure 4:
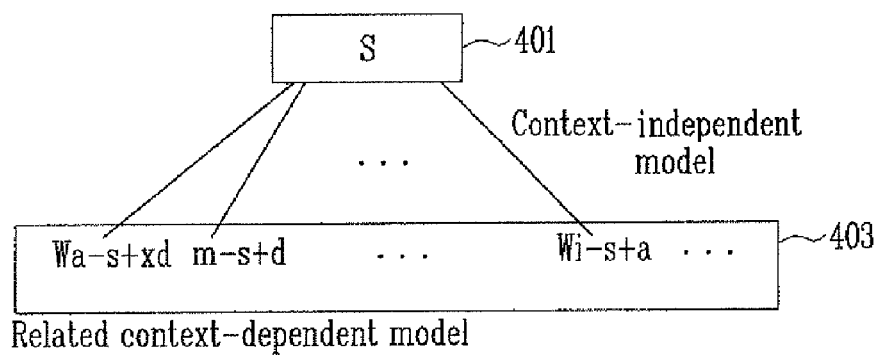
FIG. 4 illustrates the hierarchical structure of a simplified phoneme-like unit model parameter and a context-dependent phoneme recognition model parameter, which are used in a minimum phoneme classification error method according to an exemplary embodiment of the present invention.

FIG. 4 illustrates the hierarchical structure of a simplified phoneme-like unit model parameter and a context-dependent phoneme recognition model parameter, which are used in a minimum phoneme classification error method according to an exemplary embodiment of the present invention.

Referring to FIG. 4, S 401 denotes a single phoneme value of the simplified phoneme-like unit model parameter. In this case, context-dependent phonemes W having value S as a middle phoneme value, such as Wa−s+xd, m−s+d . . . Wi−s+a . . . , may be connected as lower structures (403). Corresponding to the single phoneme value of the simplified phoneme-like unit model parameter, the lower structures may be a plurality of phonemes that exist in a lower layer. Due to the hierarchical structure, the model change information obtained from the segmented alignment information of the simplified phoneme-like unit model parameter illustrated in FIG. 3 may be reflected in all context-dependent recognition phoneme models connected to a lower structure of the corresponding single phoneme model parameter, so that a context-dependent recognition phoneme model that does not appear in the environment adaptive speech data can be changed into a model having high discrimination.

A method of recognizing speech suggested by the present invention enables a speech recognition system to be efficiently adapted to a target noise environment. Also, through the suggested method, even small capacity data collected in the target environment can sufficiently discriminate between speech recognition units in the corresponding environment.

Exemplary embodiments of the invention are shown in the drawings and described above in specific terms. However, no part of the above disclosure is intended to limit the scope of the overall invention. It will be understood by those of ordinary skill in the art that various changes in form and details may be made to the exemplary embodiments without departing from the spirit and scope of the present invention as defined by the following claims.

What is claimed is:

1. A method of generating a noise adaptive acoustic model, comprising:

generating a baseline model parameter from large-capacity speech training data including an environment noise using a processor; and receiving the generated baseline model parameter and applying a discriminative adaptation method to generate a migrated acoustic model parameter, wherein the applying the discriminative adaptation method comprises:

dividing the received baseline model parameter into a simplified phoneme like unit model parameter and a context-dependent model parameter;

applying the divided simplified phoneme like unit model parameter to the predetermined environment adaptive speech data to perform viterbi decoding; and changing the simplified phoneme like unit model parameter and the context-dependent model parameter in response to the viterbi-decoded results.

2. The method of claim 1, wherein the generating the baseline model parameter comprises:

a removing the noise included in the large-capacity speech training data; and an applying an acoustic model training method to the speech training data, from which the noise is removed.

3. The method of claim 1, wherein the applying the discriminative adaptation method comprises receiving environment adaptive speech data corresponding to speech collected in a predetermined environment.

4. The method of claim 3, wherein a quantity of the environment adaptive speech data is less than that of the speech training data.

5. The method of claim 1, wherein the speech training data is converted into a signal in a reduced form that has waveform features.

6. The method of claim 1, wherein the simplified phoneme like unit model parameter exists in an upper layer of the context-dependent model parameter.

7. The method of claim 1, wherein the performing the viterbi decoding comprises generating N-best recognition results and segmented alignment information of the input speech data.

8. The method of claim 1, wherein the changing the simplified phoneme like unit model parameter is performed by a minimum classification error method.

9. The method of claim 1, wherein the changing the context-dependent model parameter is performed in response to phoneme alignment information and loss function score inherited from the simplified phoneme like unit model parameter.

10. A noise adaptive discriminative adaptation method, comprising:

receiving a baseline model parameter;

dividing the received baseline model parameter into a simplified phoneme like unit model parameter and a context-dependent model parameter using a processor;

applying the divided simplified phoneme like unit model parameter to predetermined environment adaptive speech data to perform viterbi decoding on the applied results; and changing the simplified phoneme like unit model parameter and the context-dependent model parameter in response to the viterbi decoded results.

11. The method of claim 10, wherein the simplified phoneme like unit model parameter exists in an upper layer of the context-dependent model parameter.

12. The method of claim 10, wherein the performing viterbi decoding comprises generating N-best recognition results and segmented alignment information of input speech data.

13. The method of claim 10, wherein the changing the simplified phoneme like unit model parameter is performed by a minimum classification error method.

14. The method of claim 10, wherein the changing the context-dependent model parameter is performed in response to phoneme alignment information and loss function score inherited from the simplified phoneme like unit model parameter.

15. An apparatus for generating a noise adaptive acoustic model, comprising:
a noise adaptive training unit running on a processor for generating a baseline model parameter from large-capacity speech training data including an environment noise; and
a discriminative training unit for receiving the generated baseline model parameter and applying a discriminative adaptation method to generate a migrated acoustic model parameter,
wherein the applying the discriminative adaptation method comprises:
dividing the received baseline model parameter into a simplified phoneme like unit model parameter and a context-dependent model parameter;
applying the divided simplified phoneme like unit model parameter to the predetermined environment adaptive speech data to perform viterbi decoding; and
changing the simplified phoneme like unit model parameter and the context-dependent model parameter in response to the viterbi-decoded results.

16. A noise adaptive discriminative training apparatus, comprising:
a baseline model parameter receiver running on a processor for receiving a baseline model parameter;
a parameter divider for dividing the received baseline model parameter into a simplified phoneme like unit model parameter and a context-dependent model parameter;
an environment adaptive speech data storage unit for storing speech data corresponding to a predetermined environment;
a speech recognition unit for applying the divided simplified phoneme like unit model parameter to data stored in the environment adaptive speech data storage unit to perform viterbi decoding; and
a minimum speech classification error unit for changing the simplified phoneme like unit model parameter and the context-dependent model parameter in response to the viterbi decoded results.

* * * * *